United States Patent
Arnez et al.

(10) Patent No.: US 7,409,539 B2
(45) Date of Patent: Aug. 5, 2008

(54) SYSTEM DESIGN AND CODE UPDATE STRATEGY TO IMPLEMENT A SELF-HEALING, SELF-VERIFYING SYSTEM

(75) Inventors: Andreas Arnez, Schoenaich (DE); Joern Engel, Boeblingen (DE); Frank Haverkamp, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 11/197,568

(22) Filed: Aug. 4, 2005

(65) Prior Publication Data
US 2007/0033387 A1 Feb. 8, 2007

(30) Foreign Application Priority Data
Aug. 6, 2004 (EP) .................. 04103819

(51) Int. Cl.
*G06F 9/445* (2006.01)
*G06F 15/177* (2006.01)

(52) U.S. Cl. .............. 713/100; 713/1; 713/2; 714/1; 714/2; 714/3; 714/7; 714/36

(58) Field of Classification Search ........... 713/100
See application file for complete search history.

(56) References Cited

U.S. PATENT DOCUMENTS

| | | | | |
|---|---|---|---|---|
| 6,629,259 | B2* | 9/2003 | Lee | 714/2 |
| 6,651,188 | B2* | 11/2003 | Harding et al. | 714/38 |
| 6,665,813 | B1* | 12/2003 | Forsman et al. | 714/15 |
| 6,745,329 | B1* | 6/2004 | Kao | 726/24 |
| 6,757,838 | B1* | 6/2004 | Chaiken et al. | 714/5 |
| 6,892,323 | B2* | 5/2005 | Lin | 714/36 |
| 7,206,971 | B2* | 4/2007 | Zeller et al. | 714/36 |
| 2004/0153846 | A1* | 8/2004 | Lee | 714/42 |
| 2005/0273588 | A1* | 12/2005 | Ong et al. | 713/2 |

* cited by examiner

*Primary Examiner*—Nitin C Patel
(74) *Attorney, Agent, or Firm*—Lynn L. Augspurger

(57) ABSTRACT

The present invention relates to boot code processing of a computer system, and in particular to a method and respective system for managing boot code of a computer system, wherein the system comprises at least a first and a redundant second boot memory portion, and wherein the system is booted from one of said portions, referred to as the active booting portion, the other boot portion being in a stand-by mode and being referred to as inactive boot portion. In order to increase the robustness of a computer system against failures due to errors in boot code updates it is proposed to perform the steps of: a) booting the system from said first one (default) of said two boot memory portions; b) verifying the correctness of the boot procedure, if not correct; c1) re-booting from said second boot portion, and c2) replicating the boot code from the active boot memory portion to the non-active boot memory portion, if correct; d) replicating the boot code from the active boot memory portion to the non-active boot memory portion; e) run normal operation mode.

10 Claims, 3 Drawing Sheets

SYSTEM DESIGN AND CODE UPDATE STRATEGY TO IMPLEMENT A SELF-HEALING, SELF-VERIFYING SYSTEM

FIELD OF THE INVENTION

The present invention relates to a boot code processing of a computer system, and in particular to a method and respective system for managing boot code of a computer system, wherein the system comprises at least a first, 12, and a redundant second, 14, boot memory portion, and wherein the system is booted from one of said portions, referred to as the active booting portion, the other boot portion being in a stand-by mode and being referred to as inactive boot portion

DESCRIPTION OF PRIOR ART

Software update in a computer system usually implies a certain risk that the system is not behaving properly after resetting it. This risk depends mostly on the programs/data which are updated and how important they are for the system's overall functionality.

For embedded systems the question of software updates becomes particularly difficult due to the lack of user interface comfort. But also for PCs, the boot code update is critical: consider a failing update of the PC's BIOS. If this fails, the user has lost the ability to update his system and worse, he cannot boot his PC anymore. He must send his main board back to the manufacturer, who has the hardware devices to re-flash the BIOS code to the appropriate flash chips on the board. There are several reasons shy an update may fail: the user picked a bad/wrong version of the code from the manufacturer's webpage and the update processes failed in detecting this. The update was installed, but the system will fail in detecting this. The update was installed, but the system will fail on the next reboot. Another situation is where the system lost power during the critical update operation or user lost his patience and reset his system in the middle of the update procedure because the progress bar was moving too slowly.

In FIG. 1, a prior art boot system is presented: A CPU 10 executes via the programmatic control (hardwired instructions) of a respective boot controller 12 some boot code, which is stored at a first boot bank 14 located in a safe area in main memory. If something goes wrong, the controller actuates a switch 13 in order to run boot code from a second boot bank 16. Should the boot code located in boot bank 16 also include errors, then the system cannot be run.

Thus, in these scenarios of general prior art, the system is unusable after the failing code update procedure. In some professional environments a plurality of PC controllers must be updated concurrently. A failing update of one single system of them will cause the complete system to fail. This will cause user and customer anger and a huge amount of costs to fix the system afterwards.

U.S. Pat. No. 5,793,943 describes a prior art system having the ability to toggle to a stand-by BIOS if one is detected to broken, and if needed, to use the second BIOS to restore the content of the first BIOS in case it is corrupted. The detection of data corruption is done by CRC or ECC. Later on in the operation of the system the content of the functional second BIOS RAM is loaded into the RAM and later is loaded from RAM into the first BIOS ROM. Disadvantageously, however, the system might fail, in cases in which the CRC and ECC test was completed successfully, but the boot code ends up in a hang-up situation, like endless loops or anything else, which was not foreseeable. Further, many states must be managed in order to make the boot controller robust. Finally, no teaching is given for doing a safe update of boot code.

OBJECTIVES OF THE INVENTION

It is thus an objective of the present invention to increase the robustness of a computer system against failures due to errors in boot code updates.

SUMMARY AND ADVANTAGES OF THE INVENTION

This objective of the invention is achieved by the features stated in the appended independent claims. Further advantageous arrangements and embodiments of the invention are set forth in the respective dependent claims. Reference should now be made to the appended claims.

The present invention is based on the idea that a system always has to keep the ability to update itself. This is especially important in failure scenarios like power loss and interrupted update attempts. The present invention helps to overcome problems in these areas and allows for recovery and "self-healing".

With reference to the appended claims, when performing the steps of:

a) booting the system from said first one (default) of said two boot memory portions;

b) verifying the correctness of the boot procedure, if not correct, which may include checking for error-free executability of the boot code, for example by time-out control against endless loops;

c) replicating the boot code from the active boot memory portion to the non-active boot memory portion, if correct, d) replicating the boot code from the active boot memory portion (14) to the non-active boot memory portion, e) run normal operation mode, then, the normal operation mode is only run after a successful boot from the first memory boot portion. Checking for error-free executability of the boot code enables for excluding CRC-error free boot code, which has, however run-time problems like looping endlessly in a hang up situation, etc. Thus, the system may be run in an untested customer environment The key is never to lose the ability to update itself. Fully symmetric operation is possible. This method is usable for recovering the operation of a computer system after an unsuccessful code update of a boot software loaded thereon. An additional advantage is that there is no status information like "from which" required to manage.

When performing the additional step of comparing the boot load of both portions, and replicating the boot code from the active boot memory portion to the non-active boot memory portion only in case of differences, this saves time, when both boot loads are identical, in particular for cases where overwriting a boot memory is slow.

When the normal operation mode is run after a successful boot from the second memory boot portion, in case the booting from the first portion was not successful, then the system remains usable in case of a hardware error residing at the first portion.

Further advantageously, a time-controlled logic is provided for providing a switching from the active to the inactive boot portion, when a predetermined time-out is reached during boot operation of the active portion.

Further advantageously, said time-out is set to zero to intentionally toggle the boot portion.

Further advantageously, said first memory portion is the standard boot portion, from which the system is booted by default, and the second boot portion is used as alternate boot portion only in case of boot code update and recovery procedures. This way, state handling is rendered easy.

In case of boot code update procedures, a new boot code version is stored at the alternate boot portion, advantageously the sequence of steps if performed as follows:

a) booting the system from said alternate memory portion, b) verifying the correctness of the boot procedure, if not correct, c) re-booting from said standard boot portion, and d) storing a piece of additional invalidation code, referred to herein also as "sanity code" which makes the alternate memory portion the active portion, at a predetermined memory location of the standard boot portion, which is updated last by the subsequent replicating step, e) replicating the boot code from the alternate boot memory portion to the standard boot memory portion, f) booting from said standard boot portion.

Further, the inventional method can be advantageously applied for booting an embedded system including the application-specific runtime environment. This helps to operate the system to work in a reliable form without any user interaction.

The present invention is particularly suited to be applied for boot code management of embedded systems, as the runtime stability and availability of such systems is generally quite important, and because the human interface to such system is generally quite limited.

The following assumptions are optional in nature and serve to further simplify the system design and to reduce the error scenarios needed to guarantee an error-free running of the boot management according to the invention:

1. The (system management) application should normally only be run from the default bank. The alternative bank is therefore only used for system update and the recovery/self-healing procedure.

2. Furthermore we imply that in general both banks contain exactly the same code, except in a code update or failure situation.

BRIEF DESCRIPTION OF THE DRAWINGS

The present invention is illustrated by way of example and is not limited by the shape of the figures of the drawings in which.

DETAILED DESCRIPTION OF THE PREFERRED EMBODIMENT

Figure 1:
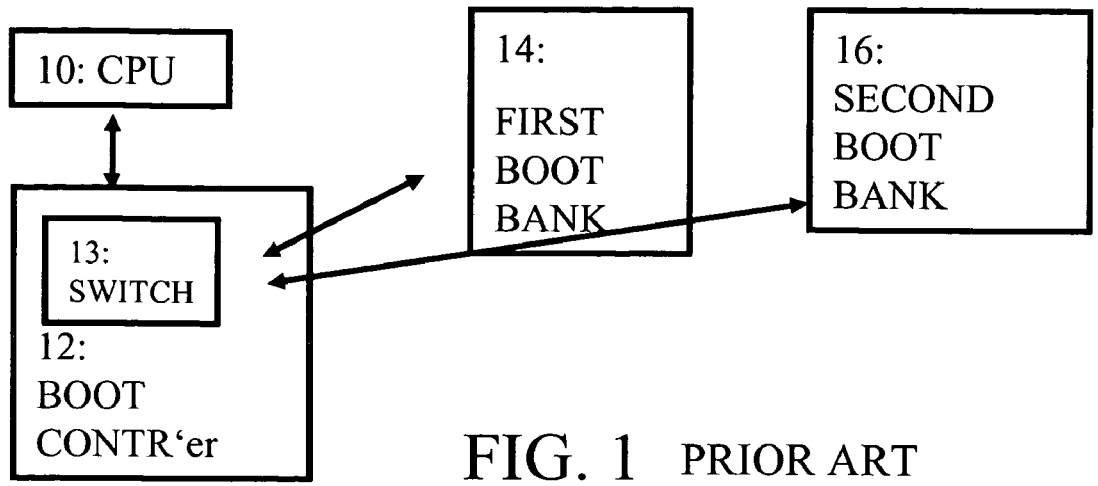
FIG. 1 is a schematic representation of the basic structural elements required for booting a computing system (prior art).
Figure 2:
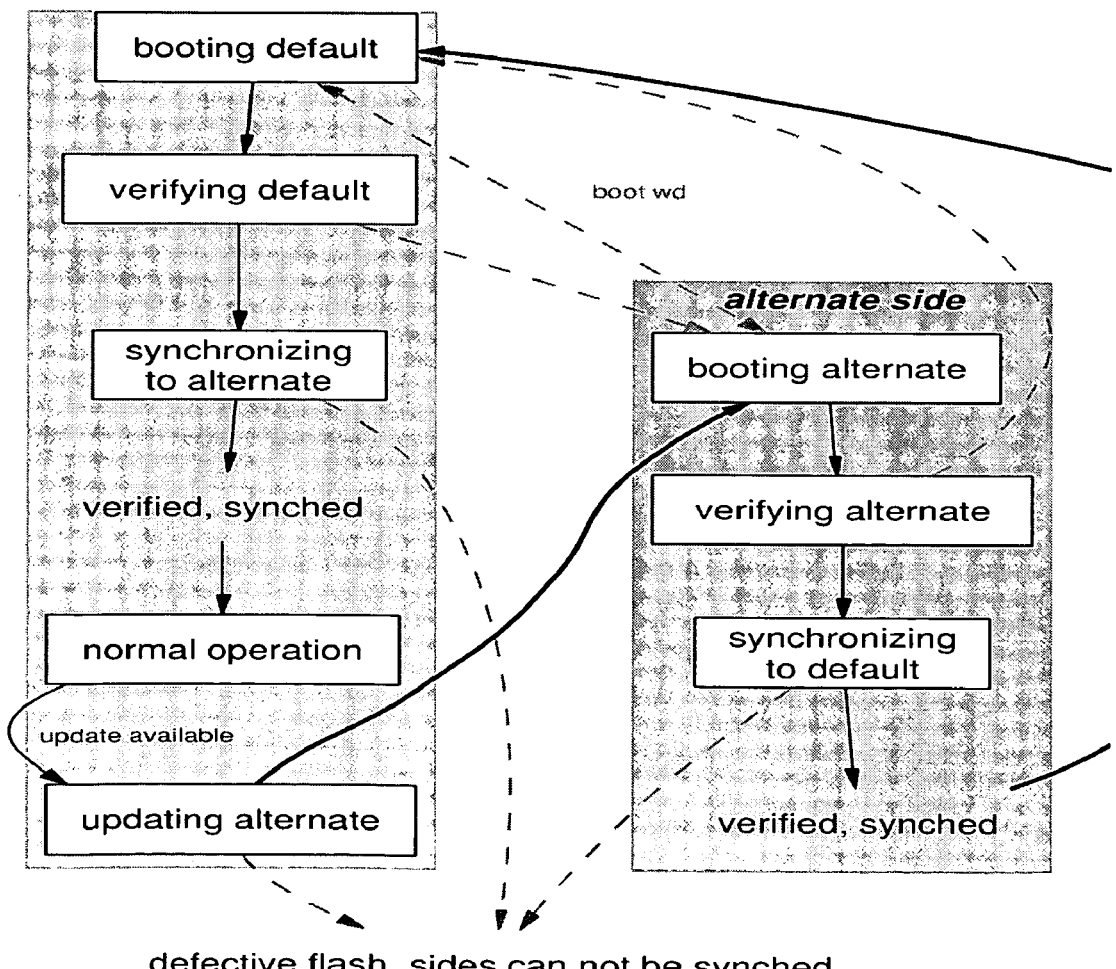
FIG. 2 is a schematic representation of the control flow visualized in an overview representation when booting according to the present invention.

With general reference to the figures and with special reference now to FIG. 2 an overview on the basic inventional functionality is given. Details thereof are described along with the description of FIGS. 3 and 4 later below.

The memory space or portion where the code load is stored which is to be executed when the system is powered on is referred to herein as default bank, the space where the code load is stored, which is used when the code on the default bank fails, is referred to as alternate bank. FIG. 2 depicts both memory portions, default left and alternate right side.

In order to implement the inventional method, the hardware needs to have mechanisms for automatic recovery and enough resources to store the critical code twice allowing automatic software recovery.

The basic sequence of steps supported by the arrows in the figure, are in summary as follows:

Boot from the default bank, verify the boot process according to prior art, if error-free, then copy the boot code from the default to the alternate bank which enables for a kind of "synchronization" between both boot codes, run normal operation of the application. If an update of the boot code is required, install the new boot code load to the alternate side, then boot from the alternate side, verify the new code load. If error-free, then copy the new code load to the default bank and perform normal operation. In case of boot errors, fall back to the booting from the default side as described above.

As a skilled reader may appreciate, according to the invention the first attribute the system must have, is the ability to automatically toggle between two code loads, i.e. two different executable boot code portions, if one of them if failing. This can be implemented with a special hardware watchdog which is always activated when the system is started or rebooted. If not disabled within a certain timeout, the system will automatically pick the alternate code load instead of the code load which is chosen on power-on. This can for example be done by toggling one of the upper address lines of an External Bus Controller (EBC). This procedure may be technically implemented in multiple ways. This feature is referred to herein as "bootwatchdog".

The system further must have the ability to store the critical code load at two different memory locations or memory portions as mentioned in the claims.

The boot code update feature disclosed furthermore by the present invention is based on the ability to intentionally toggle the code load, e.g. by re-enabling the bootwatchdog and letting it expire by setting the timeout to zero.

For performing a boot code update the inventional controller can do two things: it may ask an eternal source for new code, which is referred to as poll method. Or, the controller itself offers the possibility to install new code load. This can be implemented by running a web-browser, from where new code load can be uploaded to the controller. This is referred to as push method. The invention maybe used with boty ways and is independent from the transfer protocol in use.

Figure 3:
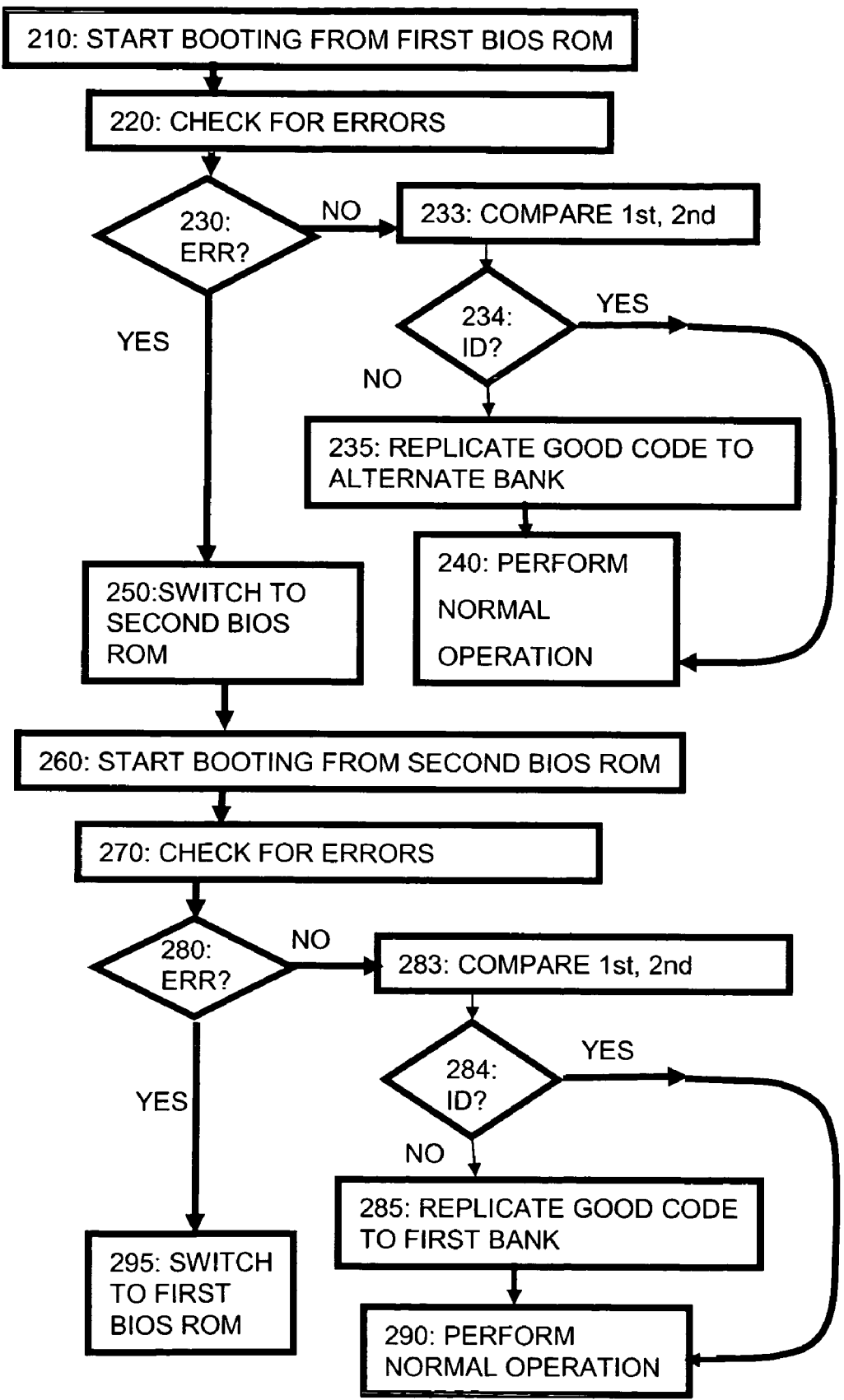
FIG. 3 is a schematic representation of the control flow when booting according to a preferred embodiment of the present invention.
Figure 4:
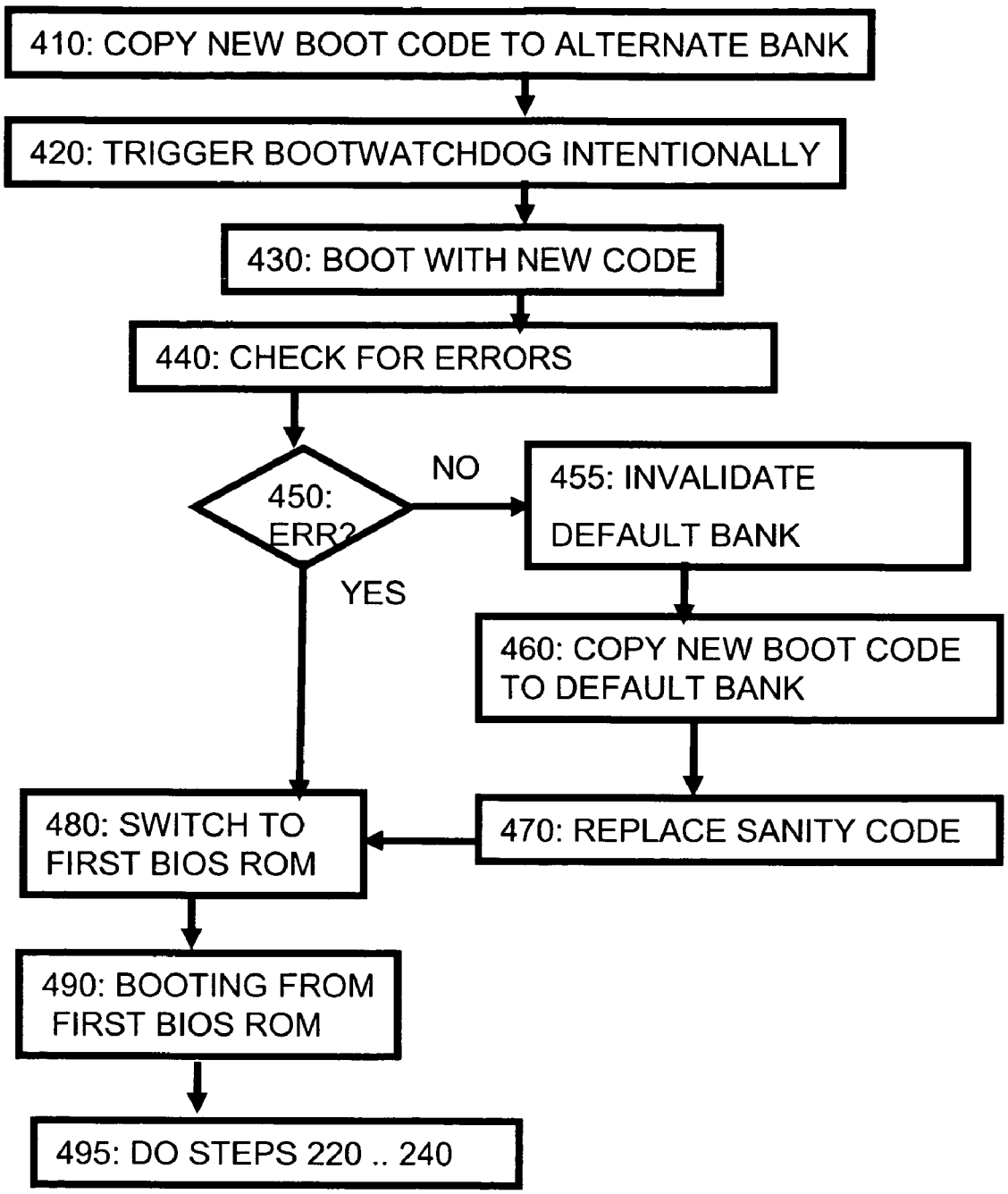
FIG. 4 is a schematic representation of the control flow when updating the boot code according to a preferred embodiment of the present invention.

With reference to FIG. 3, more details are described as follows. To implement a "self-healing" system, i.e. which is able to recover when the code update procedure is interrupted or when bad code load was offered by the user, the following system startup phase is advantageously proposed: When the power is switched-on the system starts the code on the default bank, step 210. The boot code performs testing of the hardware like the DDRAM and CRC checking for code and configuration data, step 220. When the operating system is started, the more extensive checking of the system and its code load is possible e.g. file systems contain (CRC or other) check sums as well. Of course, not only testing of the correctness of the code load is possible in this step, but also the system management application can perform checks if the hardware is working properly with the software on the system. A failure during any of these tests, symbolized by decision 230 will cause the inventional boot controller logic to toggle, step 250, intentionally to the alternate bank, to perform system recovery, steps 260 to 290. This will be described in more detail when discussing the error scenarios later below.

When the verification step is successfully passed, see the NO branch in decision 230, it is checked if the code load on default and alternate bank is the same, step 233, decision 234. If this is not the case, see 234, NO branch, the data from the verified default bank is coped, i.e. replicated to the alternate bank, step 235.

It should be noted that the optional step of comparing before writing the flash and not writing if the content is the same enhances performance for particular systems. Thus, the boot codes on both sides are identical, i.e. "synchronized". Now the system management application or the actual runtime application of an embedded system, e.g., a cashier program in supermarket or the motor surveillance in a car, etc., can be started, step 240.

Next, the update procedure will be described, i.e., how a new boot code load is stored and tested on the controller according to a preferred embodiment of the invention. Error scenarios which may happen, e.g. interruption are explained later below. If new code load is to be stored on the system it must be copied to the alternate bank. The default bank is still untouched because the new code load must be tested and verified before it can be stored on the default bank. To perform this, the bootwatchdog is intentionally triggered to execute the code on the alternate bank, step 420.

The code on the alternate bank, see the right hand side in FIG. 2, boots up, step 430, and performs the verification step, step 440. After the verification of the new code on the alternate bank succeeded, see decision 450, NO branch, the new boot code is copied to the default bank, step 460.

According to a particular advantageous feature of the invention, before the new code is copied in step 460, the default bank is made invalid, see step 455, for example, by storing a piece of code to it, which automatically toggles the banks. This code may reside for example at the end of a flash memory, where the reset vector is stored. At the same time this is the part of the flash which will be updated last. For other systems this "sanity action" may look different than this. This bank switching code will help to perform recovery, if the code update of the default bank is interrupted, e.g. by power loss, and will avoid that any code on the default bank is started which is not completely updated.

When the update is completed this "little code snippet" from step 455 is replaced, step 470, by the real code and the state of the system is now "verified and synchronized".

Due to the beforementioned advantageous assumption that the system management code hs to be run from the default bank, the system toggles back to the default bank, step 480, and boots the system with the new code load, step 490. The synchronizing step, see back to the description of FIG. 3, steps 220, 230, 233, 234, 235 on the defaualt bank is now only a compare operation, because both, the default and the alternate bank contain the new code load.

Next, some error scenarios are discussed with reference to the inventional specific measures.

An interrupted code update can happen, for example, when the controller loses electrical power or a network connection used to stream the new code to the controller is interrupted. When executing the update code on the default bank, see step 430, the update of the alternate bank is interrupted in the middle of step 460 by such power loss. When the system boots up the next time from the default bank, see the former assumptions, the "synchronizing/replicating to alternate" step 235 in FIG. 3 will copy the code from the default bank, which is not corrupted and contains yet the former boot code version, to the incomplete (corrupted) alternate bank. The system thus "heals" itself by going back to the former, unupdated code load on both banks. The user may then retry to complete the code update later.

When executing boot code on the alternate bank, see step 260, including check for errors 270, 280, compare first with second bank for identity, step 283, etc (steps 38*x* correspond to steps 23*x*, step 290 corresponds to 240) in FIG. 3, then due to the beforementioned code snipet, which is stored to make the default bank invalid in step 455, any interruption of the update procedure running on the alternate bank will result in automatic bank toggling at any subsequent bootup. This will cause the code update of the default bank to be finished. Both the default and the alternate side will contain now the new code load.

Thus only in the very rare cases of hardware errors decision 280 is left in the error case, i.e. the YES branch, which would result in a switch to the first BIOS ROM, step 295.

Further, when bad code load, i.e. boot code containing verifiable errors, is copied to the alternate bank, the verification step is designed to toggle back to the default bank, where the synchronized code will take care, that the old code load, i.e. the former version, is used to recover the system and bring the alternate side back to a working stage with the former code load.

Advantageously, two different scenarios are distinguished for the example system. The first one is when the boot code is not working. Here the bootwatchdog will expire and the rollback procedure will happen automatically.

The second scenario is when the boot code can successfully start the operating system but the operating system panics and the panic will reboot the system to the same bank, which happens in the example system. In the latter case the boot code will determine the bank, on which the code runs—here the alternate bank—and, if the reason for the reset is not the bootwatchdog expiration, it will automatically invoke the bootwatchdog again to start the recovery running on the default bank. Note that the example system is able to detect various reset reasons including an operating system panic and a reset due to bootwatchdog expiration.

Here, the optional additional assumption that no system management code us run from the alternate bank is applied, because a reboot may be part of the normal operation or can happen due to an operating system error, but any kind of reboot other than a bootwatchdog-triggered reboot is invalid and therefore the code running on the alternate bank is considered to be not working as it should. This helps significantly to reduce the number of error scenarios.

Next, hardware failures are considered: It is possible that one bank fails due to hardware errors, while the other is unaffected. Thus, there may be some need for the ability to continue operation in some sort of degraded mode under such circumstances. It would certainly be possible to add some software complexity in order to deal with this situation. However, there is no indication that such a hardware error is likely, while software errors are a permanent problem. Also, reports indicate that flash chips usually don't suddenly stop operating but become noticeably slower near their end-of-life. Therefore it seems likely that a software circumvention for this uncommon hardware problem will create more problems on the software side than it solves on the hardware side.

A skilled reader may appreciate that the inventional approach has increased robustness, which lies in the symmetry of the management betweel default and alternate bank, and the ability to perform "self-healing", which prevents the user from accidentally storing not properly working code on his system. Furthermore, it executes automatically without human intervention.

The amount of error scenarios is reduced to a minimum, specially considering a system which has such a powerful feature like the bootwatchdog facility, by the assumptions that system management code has to be executed no the default bank and due to the symmetric layout of the code load on default and alternate bank. The proposed solution has minimum state-across-resets and allows therefore a very simple and tesetable system design.

Further, the inventional principal may be used for updating the code of an entire operating system, if required. In this case the functional test of the operating system should be restricted to the main functions thereof; otherwise the test would last too long.

Sample Implementation:

The following script uses an application called mtdflash to perform the inventional update steps. It also makes usage of a special infrastructure to determine on which bank the current code runs and which the last reset type was.

update.sh

The script does some optimizations namely to do the synchronization steps only in case of:

1. a power on reset
   We need to check in case of an update attempt interrupted by power loss.
2. a pinhole reset (pressing the hardware reset button)
   Eventually the system got stuck and the user wants to recover.
3. the parallel-port reset (usage of external hardware to reset the system, for example a parallel port debugging hardware or a software debugger).
   We need to perform the synchronization step because the external tool may have written to the boot code memory portion, for example a flash memory,
4. and a bootwatchdog reset.
   kind of reset is used in our procedure.

The before-mentioned reset-types are the only ones where the flash content could be touched. To complete the solution there is also a small code piece in bootcode required to allow to toggle the bootwatchdog in case of a failure of the code on the alternate bank. This code may be as follows:

```
bbank_t bbank;
bbank = plugin_bbank_read(pinfo);
if ((bbank == BBANK_ALTERNATE) &&
    (reason ! = RST_REASON_BOOT_WATCHDOG)) {
    plulgin_set_bootwd(pinfo, 0);
}
...
```

The bootcode offers an interface to query the last reset reason and if it is not watchdog-caused, it reenables the bootwatchdog and sets the timeout to zero.

This will cause the bootwatchdog to expire and automatically switch back to the default side.

Synchronization

The synchronization is done with the following command:
Mtdflash—sync
Destroy Inactive Bank, see step 455, FIG. 4:
If code is run from the alternate bank, the code on the default bank needs to be invalidated to reduce the quite complex error scenarios doing the code update:
Mtd flash—destroy-inactive Afterwards the normal synchronization step must be performed.

Verification Step.

In the example the verification step is considered successful, as the operating system is able to load and run an application. This can be further enriched by letting the application run an internal self-test.

Code Installation on the Alternate Bank

The new code image can be copied to the alternate bank by using the mtdlfash tool to flash a pfi-file (partile flash image) for the alternate bank:
mtdflash rootdev.crp0.pfi
If card-specific data is already stored on the alternate bank and known to be intact, one cold use the switch—save-pdd to preserve the data. Instead of preserving one could force the card data to be overwritten with the—force-flash-all and then using the—sync-pdd switch to fix up the platform description data (pdd).

The same is true if no assumption can be made about the situation on the currently unused bank (invalid or old code), here also the—sync-pdd option has to be used:
mtdflash—sync-pdm The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods.

Computer program means or computer program in the present context means any expression, in any language, code or notation, of a set of instructions intended to cause a system having an information processing capability to perform a particular function either direction or after either or both of the following:

a) conversion to another language, code or notation;
b) reproduction in a different material form.

What is claimed is:

1. A method for managing boot code of a computer system, wherein the system comprises at least a first and a redundant second boot memory portion, and wherein the system is booted from one of said portions, referred to as an active boot memory portion, other boot memory portion being in a standby mode and being referred to as inactive boot memory portion, characterized by the steps of:
   1a) booting the system from said first one of said two boot memory portions;
   1b) verifying correctness of a boot procedure;
   1c) re-booting from said second boot memory portion and if correct;
   1d) replicating the boot code from the active boot memory portion to the inactive boot memory portion; and
   1e) running normal operation mode; and
   wherein a boot code sequence is stored at the inactive boot memory portion for safe boot code update procedures which are activated from an alternative boot memory portion of the inactive boot memory portion, which boot code update procedures comprise the sequence of steps as follows:

2a) booting the system from said alternative boot memory portion;

2b) verifying the correctness of the boot procedure, and if not correct,

2c1) re-booting from a standard boot memory portion, and

2c2) replicating the boot code from the active boot memory portion to the inactive boot memory portion, if correct, 2d) storing a piece of additional invalidation code, which makes the alternative boot memory portion the active boot memory portion, at a predetermined memory location of the standard boot memory portion, which is updated last by the subsequent replicating step, 2e) replicating the boot code from the alternative boot memory portion to the standard boot memory portion; and 2f) booting from said standard boot memory portion.

2. The method according to claim 1, further comprising the steps of:
comparing a boot load of both boot memory portions, and replicating the boot code from the active boot memory portion to the inactive boot memory portion only in case of differences.

3. The method according to claim 1, wherein the normal operation mode is run after a successful boot from the second boot memory portion, in case the booting from the first boot memory portion was not successful.

4. The method according to claim 1, wherein a time-controlled logic is provided for providing a switching from the active boot memory portion to the inactive boot memory portion, when a predetermined time-out is reached during boot operation of the active boot memory portion.

5. The method according to claim 4, wherein said time-out is set to zero to intentionally toggle the boot memory portion.

6. The method according to claim 1, wherein said first boot memory portion is a standard boot memory portion, from which the system is booted by default, and the second boot memory portion is used as alternative boot memory portion only in case of boot code update and recovery procedures.

7. The method according to claim 1, applied for booting an embedded system including an application-specific runtime environment.

8. A computer system having boot controller hardware and boot code stored on a boot memory for said computer system for performing the steps of:

1a) booting the computer system from a first one of two boot memory portions;

1b) verifying correctness of a boot procedure;

1c) re-booting from a second of said boot memory portions and 1d) replicating the boot code from an active boot memory portion to an inactive boot memory portion; and if correct 1e) running normal operation mode; and wherein a boot code sequence is stored at the inactive boot memory portion for safe boot code update procedures which are activated from an alternative boot memory portion of the inactive boot memory portion, which boot code update procedures comprise the sequence of steps as follows:

2a) booting the system from said alternative boot memory portion;

2b) verifying the correctness of the boot procedure, and if not correct,

2c1) re-booting from a standard boot memory portion, and

2c2) replicating the boot code from the active boot memory portion to the inactive boot memory portion, if correct, 2d) storing a piece of additional invalidation code, which makes the alternative boot memory portion the active boot memory portion, at a predetermined memory location of the standard boot memory portion, which is updated last by the subsequent replicating step, 2e) replicating the boot code from the alternative boot memory portion to the standard boot memory portion; and 2f) booting from said standard boot memory portion.

9. A computer program stored on boot memory for execution in a data processing system comprising a functional component with computer program code portions for performing respective steps of:

1a) booting the system from a first one of two boot memory portions;

1b) verifying correctness of a boot procedure, and if not correct, then 1c) re-booting from a second boot memory portion of said two boot memory portions, and if correct 1d) replicating a boot code from an active boot memory portion to an inactive boot memory portion, and 1e) running normal operation mode,
when said computer program code portions are executed on a computer, and wherein a boot code sequence is stored at the inactive boot memory portion for safe boot code update procedures which are activated from an alternative boot memory portion of the inactive boot memory portion, which boot code update procedures comprise the sequence of steps as follows:

2a) booting the system from said alternative boot memory portion;

2b) verifying the correctness of the boot procedure, and if not correct,

2c1) re-booting from a standard boot memory portion, and

2c2) replicating the boot code from the active boot memory portion to the inactive boot memory portion, if correct, 2d) storing a piece of additional invalidation code, which makes the alternative boot memory portion the active boot memory portion, at a predetermined memory location of the standard boot memory portion, which is updated last by the subsequent replicating step, 2e) replicating the boot code from the alternative boot memory portion to the standard boot memory portion; and 2f) booting from said standard boot memory portion.

10. A computer program product stored on a boot memory comprising computer readable program means for causing a computer to perform when said computer program product is executed on a computer the steps of:

1a) booting the computer from a first one of two boot memory portions;

1b) verifying correctness of a boot procedure;

1c) re-booting from a second of said boot memory portions and 1d) replicating a boot code from an active boot memory portion to an inactive boot memory portion; and if correct;

1e) running normal operation mode, and wherein a boot code sequence is stored at the inactive boot memory portion for safe boot code update procedures which are activated from an alternative boot memory portion of the inactive boot memory portion, which boot code update procedures comprise the sequence of steps as follows:
2a) booting the system from said alternative boot memory portion;
2b) verifying the correctness of the boot procedure, and if not correct,
2c1) re-booting from a standard boot memory portion, and
2c2) replicating the boot code from the active boot memory portion to the inactive boot memory portion, if correct,
2d) storing a piece of additional invalidation code, which makes the alternative boot memory portion the active boot memory portion, at a predetermined memory location of the standard boot memory portion, which is updated last by the subsequent replicating step,
2e) replicating the boot code from the alternative boot memory portion to the standard boot memory portion; and
2f) booting from said standard boot memory portion.

* * * * *